(12) United States Patent
Chang et al.

(10) Patent No.: US 8,574,733 B2
(45) Date of Patent: Nov. 5, 2013

(54) PROTECTION CIRCUIT FOR SECONDARY BATTERY AND SECONDARY BATTERY COMPRISING THE SAME

(75) Inventors: Sung Kyun Chang, Daejeon (KR); Jae Hyun Lee, Daejeon (KR); Joon Hwan Lee, Daejeon (KR); Soo Hyun Ha, Busan (KR); Jeong Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 1091 days.

(21) Appl. No.: 11/431,360

(22) Filed: May 10, 2006

(65) Prior Publication Data

US 2006/0275653 A1 Dec. 7, 2006

(30) Foreign Application Priority Data

May 10, 2005 (KR) .................. 10-2005-0038676

(51) Int. Cl.
*H01M 10/50* (2006.01)

(52) U.S. Cl.
USPC ........................................... 429/62; 320/154

(58) Field of Classification Search
USPC ............................................ 429/62; 320/154
See application file for complete search history.

(56) References Cited

U.S. PATENT DOCUMENTS

| | | | |
|---|---|---|---|
| 3,037,066 A * | 5/1962 | Grieger et al. ............ | 429/59 |
| 6,001,497 A | 12/1999 | Okutoh | |
| 2001/0044044 A1 * | 11/2001 | Kaito et al. ............... | 429/62 |
| 2005/0237031 A1 * | 10/2005 | Ogawa et al. ............. | 320/156 |
| 2005/0266302 A1 | 12/2005 | Kim | |

FOREIGN PATENT DOCUMENTS

| | | |
|---|---|---|
| JP | 05234614 | 9/1993 |
| JP | 11191436 | 7/1999 |
| JP | 2002204525 | 7/2002 |
| JP | 2003-111269 | 4/2003 |
| JP | 2004-206894 | 7/2004 |
| JP | 2004311350 | 11/2004 |
| KR | 1019980071780 | 10/1998 |
| KR | 1019990063342 | 7/1999 |
| KR | 1020010095529 | 11/2001 |
| KR | 1020030033594 | 5/2003 |
| KR | 1020040084667 | 10/2004 |
| TW | 370732 | 9/1999 |

(Continued)

OTHER PUBLICATIONS

Machine translation of JP 2002204525 A, Tamai et al., Jul. 2002.*

(Continued)

*Primary Examiner* — Sean P Cullen
(74) *Attorney, Agent, or Firm* — Lerner, David, Littenberg, Krumholz & Mentlik, LLP

(57) ABSTRACT

Disclosed is a protection circuit for a secondary battery and a secondary battery having the same, which can interrupt electric current input into the secondary battery when the temperature of the secondary battery increases due to an overcharge, and also can protect the secondary battery in the case where the already charged secondary battery is exposed to a high temperature due to the increase of an external or internal temperature of the secondary battery. The protection circuit includes: means having one end connected to a first electrode of the secondary battery, for restricting electric current; switching means for connecting a second electrode of the secondary battery to a first outer electrode, or to the current restriction means in response to temperature; and a conducting wire for connecting the first electrode of the secondary battery to a second outer electrode.

8 Claims, 7 Drawing Sheets

(56) References Cited

FOREIGN PATENT DOCUMENTS

| TW | 388999 B | 5/2000 |
|----|----------|--------|
| TW | 472406 | 1/2002 |
| TW | 200616300 | 5/2006 |

OTHER PUBLICATIONS

International Search Report PCT/KR2006/001750 Dated Jun. 28, 2006.

\* cited by examiner

<room temperature> <high temperature>

PROTECTION CIRCUIT FOR SECONDARY BATTERY AND SECONDARY BATTERY COMPRISING THE SAME

This application claims the benefit of the filing date of Korean Patent Application No. 2005-38676, filed on May 10, 2005, in the Korean Intellectual Property Office, the disclosure of which is incorporated herein in its entirety by reference.

BACKGROUND OF THE INVENTION

1. Field of the Invention

The present invention relates to a secondary battery, and more particularly to a protection circuit for a secondary battery and a secondary battery having the same, which can protect the secondary battery even in case of its being exposed to high temperature, as well as prevent the temperature of the secondary battery from increasing due to an overcharge.

2. Description of the Prior Art

Recently, as the application field of the secondary battery has been expanded to an energy source of portable terminals, camcorders, laptop PCs, Hybrid Electric Vehicles (HEVs), and Electric Vehicles (EVs), the research and the development for the secondary battery has been gradually accelerated.

Among the present secondary batteries which are available, a lithium ion secondary battery which had been developed in the early 1990's and has been in the limelight has a merit of having an operation voltage and an energy density greatly higher than those of a conventional battery including a Ni—MH battery, a Ni—Cd battery, and a sulphuric acid-lead battery, etc.

Generally, when a secondary battery such as a lithium ion battery is overcharged higher than a desired voltage, occurrence of a side reaction of a positive active material and an electrolyte increases. In a worse case, a collapse of the structure of the positive active material and an oxidation of the electrolyte, etc. may occur. Thereby, the lithium may also be precipitated from a negative active material. From such a state, if the voltage further increases, the secondary battery may explode or ignite.

Further, when the lithium ion secondary battery is exposed to a high temperature which is higher than the desired temperature, an electrode active material is unstably activated and rapidly reacts with the electrolyte so that the secondary battery expands. In several cases, the lithium ion battery may explode or ignite.

The possibilities of explosion and ignition of the secondary battery due to the exposure to high temperatures are changed according to the charge status of the secondary battery. More specifically, during the charge of the secondary battery, since the energy density in the secondary battery increases, and the instability of the electrode active material deepens, the higher the charge ratio increases, the more the possibility of an explosion or ignition increases.

In order to solve such a problem, according to the conventional art, an active device called "Positive Temperature Coefficient resistor (PTC resistor)" is connected to both electrodes in series, of which an inner resistance increases depending on the increase of the temperature of the secondary battery due to an overcharge, so as to interrupt electric current to be input and to prevent the overcharge.

However, since the PTC resistor interrupts the electric current to be input into the secondary battery only when the temperature of the secondary battery increases due to the overcharge, there is a problem in that the secondary battery cannot be protected when the already charged secondary battery is exposed to high temperatures.

SUMMARY OF THE INVENTION

Accordingly, the present invention has been made to solve the above-mentioned problems occurring in the prior art, and it is an object of the present invention to provide a protection circuit for a secondary battery and the secondary battery having the same, which can interrupt electric current input into the secondary battery when the temperature of the secondary battery increases due to an overcharge, and can also protect the secondary battery in the case where the already charged secondary battery is exposed to a high temperature due to the increase of external or internal temperature of the secondary battery.

In order to accomplish the object of the present invention, there is provided a protection circuit for a secondary battery, which includes: means having one end connected to a first electrode of the secondary battery, for restricting electric current; switching means for connecting a second electrode of the secondary battery to a first outer electrode, or to the current restriction means in response to temperature; and a conducting wire for connecting the first electrode of the secondary battery to a second outer electrode.

The switching means includes a bimetal to perform a desired switching operation at a high temperature.

The current restriction means is connected to the first electrode of the secondary battery by a conductor formed on the first electrode of the secondary battery, and includes a resistor having a resistance value which is large enough to avoid a collapse of the bimetal and small enough to safely discharge electric current from the secondary battery.

According to the present invention, there is provided a protection circuit for a secondary battery, which includes: means connected between a first electrode of the secondary battery and a first outer electrode, for restricting electric current; and switching means for connecting a second electrode of the secondary battery to a second outer electrode, or to the first outer electrode in response to temperature.

In the protection circuit according to the present invention as described above, the bimetal is in series connected to the positive electrode (+) of the second battery and the outer positive electrode (+) at room temperature, so as to allow the electric current to flow. When the temperature increases, the bimetal, which had been connected to the outer positive electrode (+), is connected to the outer negative electrode (−) and disconnects the positive electrode from the negative electrode of the secondary battery, so as to interrupt an inflow of the electric current from the outer electrode. In addition, the bimetal induces the discharge therethrough. Thus, the present invention interrupts the electric current applied to the secondary battery so as to prevent the increase of the temperature of the secondary battery when the temperature increases during the overcharge of the secondary battery as well as when the external or internal temperature of the secondary battery increases.

Meanwhile, in order to prevent the secondary battery from being unstable due to the heat discharge caused by the electric current flowing in the bimetal, the resistor which is a device for restricting the flow of the electric current is connected to one end of the bimetal and adjusts the amount of discharged current, so as to reduce the amount of heat generated by the bimetal and the secondary battery. Here, the resistor may be connected to the bimetal directly, or through the conducting wire.

DETAILED DESCRIPTION OF THE PREFERRED EMBODIMENTS

Figure 1:
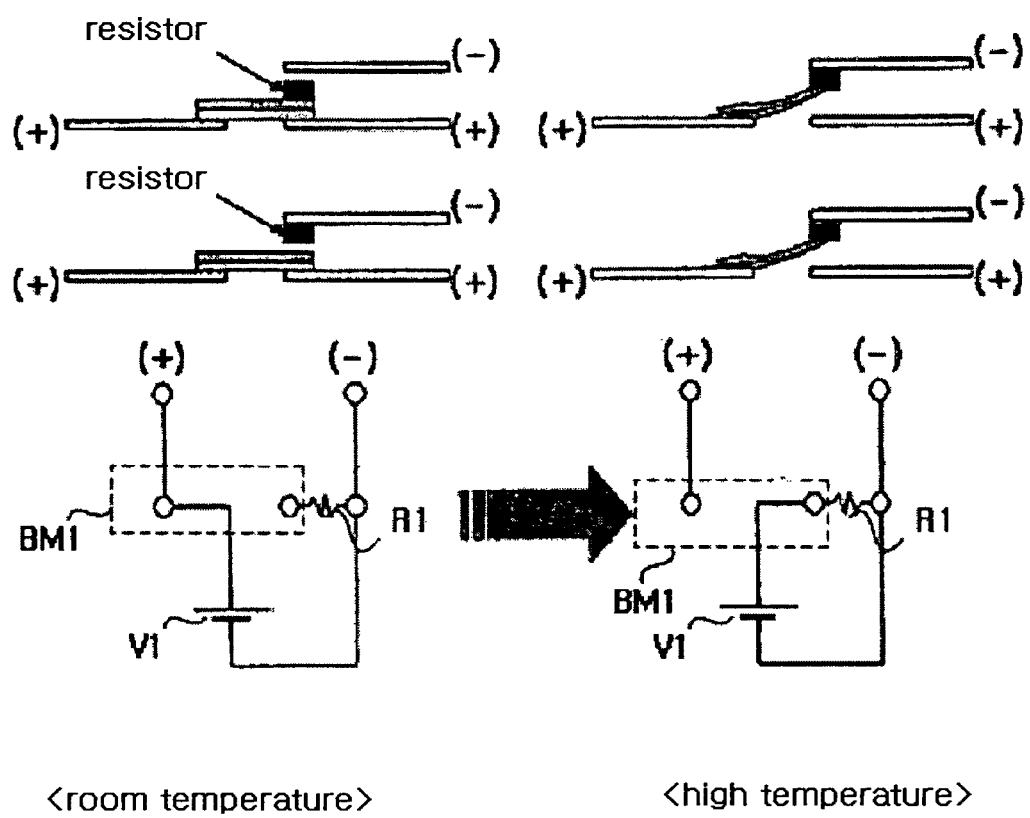
FIG. 1 is a circuit diagram illustrating a protection circuit for a secondary battery according to the first embodiment of the present invention.

Hereinafter, preferred embodiments of the present invention will be described with reference to the accompanying drawings. The description of known elements and their structures will be omitted.

The present invention interrupts electric current input into the secondary battery using a bimetal having a property of bending according to a change of temperature, in the case where the secondary battery is exposed to a high temperature. Various materials are used for the bimetal, and include an alloy of nickel and iron which has a low expansibility, and an alloy of copper and zinc, an alloy of nickel, manganese and iron, an alloy of nickel, molybdenum and iron, and an alloy of manganese, nickel and copper, which are a great expansibility. The simplest bimetal is horizontal at a low temperature, while bending toward the alloy of nickel and iron at a high temperature. Electric current flows through the bimetal at a low temperature, but cannot flow at a high temperature because the bimetal is disconnected at a contact point.

According to an embodiment of the present invention, three terminals of the bimetal are connected to the positive electrode (+) of the secondary battery, an outer positive electrode (+), and an outer negative electrode (−), respectively. The bimetal connects the positive electrode (+) of the secondary battery to the outer positive electrode (+) at room temperature, while connecting the positive electrode (+) of the secondary battery to the outer negative battery (−) at a high temperature. Here, the negative electrode (−) of the secondary battery and the outer negative electrode (−) are connected to each other.

As described above, in the case where the temperature of the secondary battery increases, as the bimetal, which had been connected to the outer positive electrode (+), is connected to the outer negative electrode (−) connected to the positive electrode (+) of the secondary battery, the positive electrode (+) of the secondary battery is connected through the bimetal to the outer negative electrode (−). Thus, the positive electrode of the secondary battery is disconnected from the negative electrode of the secondary battery by means of the bimetal so that the input of the electric current from the outer electrode is interrupted and the discharge through the bimetal is induced, thereby stably maintaining the secondary battery.

As described above, in the case where the temperature of the secondary battery increases due to the overcharge of the secondary battery, or due to external or internal influence, the present invention interrupts the electric current supplied to the secondary battery and induces the discharge of the secondary battery by using the bimetal performing a desired switching operation in response to the temperature of the secondary battery, thereby stably maintaining the secondary battery.

However, in the case where the bimetal is directly connected to the secondary battery while a short-circuiting occurs, the electric current discharged from the secondary battery rapidly flows to the bimetal, so that a great amount of heat is generated from the bimetal so as to be in proportion to the square of the electric current. The heat may cause the bimetal to collapse, or damage a physical support to maintain the bimetal mechanically. Further, when the bimetal operates at a high temperature higher than about 60° C., the secondary battery may rapidly discharge and generate heat by itself, making it become more unstable.

When the bimetal causes an outer short-circuiting, a resistor is connected between the bimetal and the secondary battery in order to adjust the amount of heat generated by the secondary battery and the bimetal. The resistor adjusts the amount of discharged electric current so as to reduce the amount of heat. For example, in the case of the bimetal having a resistance of 10 mΩ, the maximum current which flows at a voltage of 4.2V before the present lithium ion secondary battery is fully charged is 420 Ah. Therefore, if the resistance of the bimetal is identical, an outer resistor having a resistance of 1Ω is connected to the bimetal so that the current is reduced to 4.2 A and the amount of heat can be remarkably reduced.

As described above, the resistor provided to the protection circuit for the secondary battery according to the present invention has a value which is large enough to prevent the collapse of the bimetal and small enough to sufficiently and safely discharge electric current from the secondary battery. According to the present invention, the resistor has a resistance value of 1Ω~25 Ω. Specifically, in the case where the resistance is smaller than 1Ω, the resistance is too small to adjust the amount of heat generated from the bimetal, a great amount of heat is generated from the bimetal. In the case where the resistance is greater than 25Ω, the resistor itself generates a great amount of heat, thereby causing the secondary battery to become unstable.

Hereinafter, the embodiments of the present invention will be described in detail with reference to various comparative examples.

First Embodiment

Connection of Three Terminal Bimetal and Resistor

FIG. 1 is a circuit diagram illustrating a protection circuit for a secondary battery according to the first embodiment of the present invention.

The protection circuit for the secondary battery includes a bimetal BM1 and a resistor R1. One of three terminals of the bimetal BM1 is connected to the positive electrode (+) of the secondary battery V1, another one connected to the outer positive electrode (+) (not shown), and a residual one connected to one end of the resistor R1. The other end of the resistor R1 is connected to the negative electrode (−) of the secondary battery. Further, the secondary battery and the outer negative electrode (−) are connected to each other. Here, the resistor R1 may be directly connected to the bimetal BM1, or connected to the bimetal BM1 by means of the conducting wire.

Hereinafter, the operation of the protection circuit for the secondary battery, which has the above mentioned structure, will be described.

The bimetal BM1 connects the positive electrode (+) of the secondary battery to the outer positive electrode (+) at room temperature, while connecting the positive electrode (+) of the secondary battery to the outer negative electrode (−) through the resistor R1 at a high temperature. At the high temperature, the secondary battery V1 is short-circuited so that the supply of the electric current from the outer electrode is interrupted and in addition the electricity is discharged through the bimetal BM1 and the resistor R1.

Second Embodiment

Connection of Bimetal, Conducting Wire, and Resistor

Figure 2:
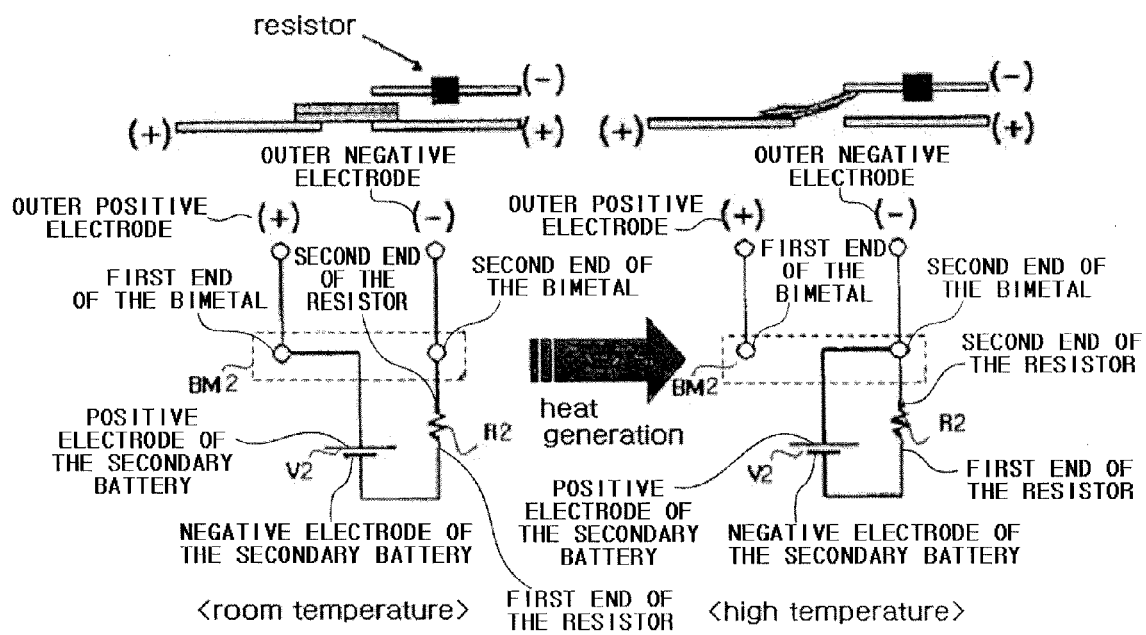
FIG. 2 is a circuit diagram illustrating a protection circuit for a secondary battery according to the second embodiment of the present invention.

FIG. 2 is a circuit diagram illustrating a protection circuit for a secondary battery according to the second embodiment of the present invention.

The protection circuit for the secondary battery includes a bimetal BM2 and a resistor R2. One of three terminals of the bimetal BM2 is connected to the positive electrode (+) of the secondary battery V2, another one connected to the outer positive electrode (+) (not shown), a residual one connected by means of a conducting wire to one end of the resistor R2 and the outer negative electrode (−). The other end of the resistor is connected to the negative electrode (−) of the secondary battery V2.

The second embodiment is identical with the first embodiment, except that the resistor R2 is connected between the negative electrode (−) of the secondary battery V2 and the outer negative electrode (−).

Third Embodiment

Connection of Bimetal, Conductor, and Resistor

Slurry was made by mixing $LiCoO_2$, which was a positive active material, a conductive agent, and a binder, and then covered aluminum foil, thereby manufacturing the positive electrode. The negative electrode was manufactured in such a manner that slurry was made by mixing a carbon-based negative active material, a conductive agent, and a binder and then covered a copper foil. A separation film made of polyethylene resin and polypropylene resin was interposed between the two electrodes which were manufactured as described above, and then the electrodes were wound and inserted into a sheath made of a metal can so as to complete a rectangular secondary battery. Here, an EC/PC based electrolyte was used for the rectangular secondary battery with a capability of 800 mAh.

The positive electrode of the secondary battery constructed as described above, was in a series connected with the two terminals of the bimetal to supply electric current below an operation temperature of the bimetal, and the residual terminal of the bimetal, which supplied electric current over the operation temperature of the bimetal, was connected to one end of a resistor of 1Ω which had the other end connected to the negative terminal, so that the protection circuit for the secondary circuit was formed.

After being charged to 4.4 Ah, the secondary battery was inserted into an oven and then heated to 150° C. at a rate of 5° C./min, which was in turn maintained at 150° C. for a hour. Next, the safety of the secondary battery was examined by measuring the change of the temperature of the secondary battery and detecting if an explosion and/or ignition occur.

Figure 3:
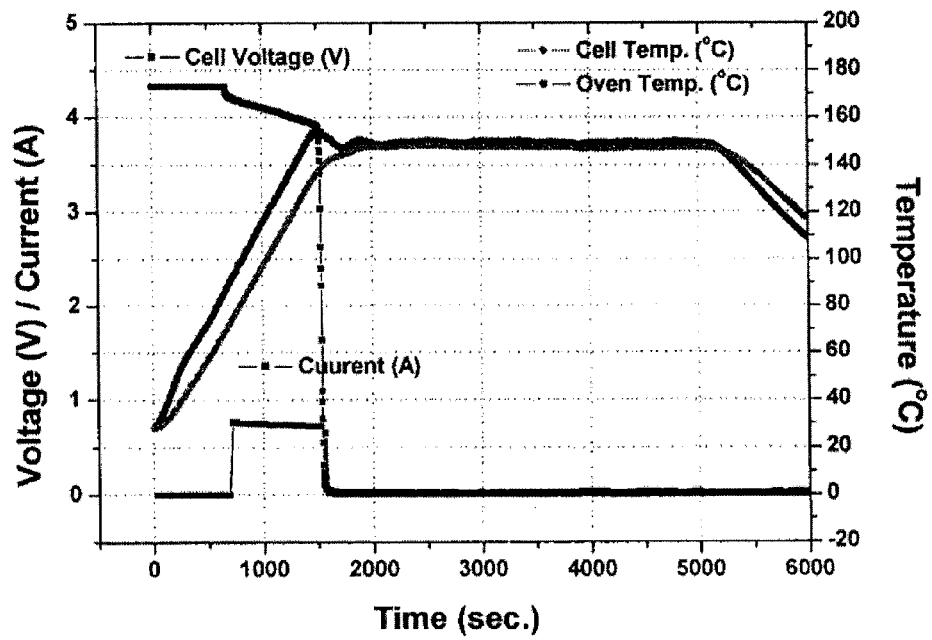
FIG. 3 is a graph illustrating an experiment according to the third embodiment of the present invention.
Figure 4:
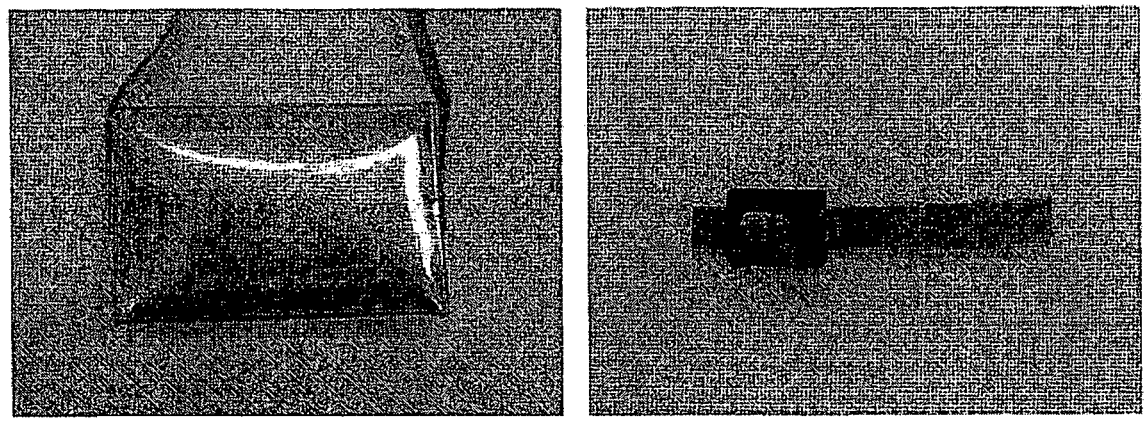
FIG. 4 is a view showing the secondary battery and a bimetal observed after the experiment according to the third embodiment of the present invention.

FIG. 3 is a graph illustrating an experiment result, and FIG. 4 is a view showing a picture relating to the secondary battery and a bimetal observed after the experiment.

As shown in FIG. 4, the explosion and ignition of the secondary battery do not occur, and also the collapse of the bimetal does not occur.

Comparison Example 1

Figure 5:
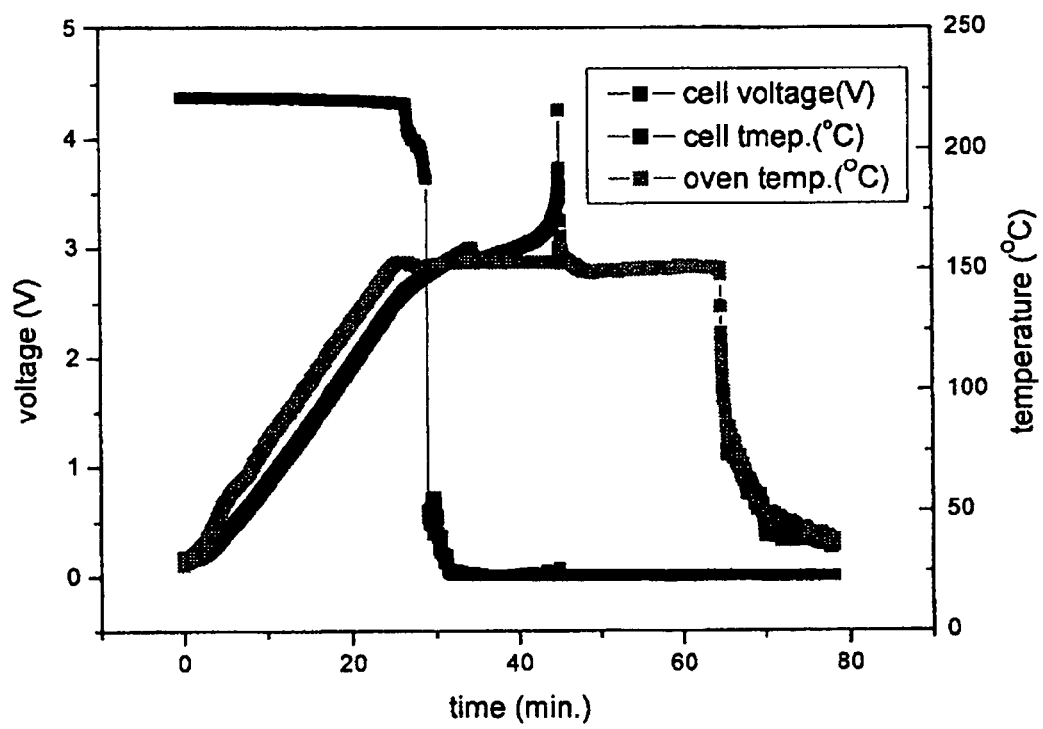
FIG. 5 is a graph showing an experiment of the first comparison example.
Figure 6:
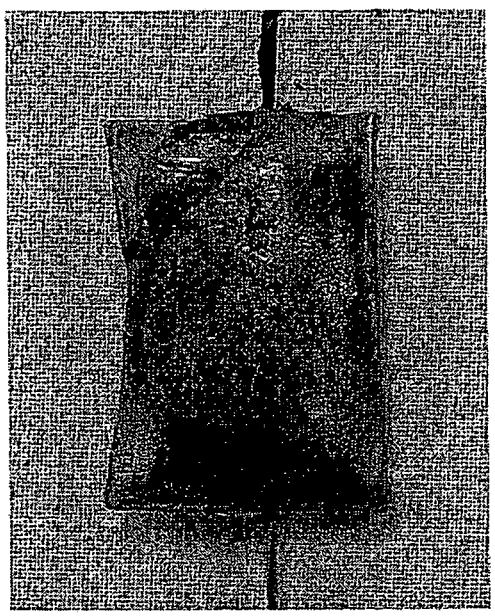
FIG. 6 is a view illustrating the secondary battery observed after the experiment is carried out by the method of the first comparison example.

A secondary battery identical with that of the third embodiment, excepting that the bimetal and resistor were not used, was prepared and examined in an identical manner with that in the third embodiment. The result is shown in FIGS. 5 and 6. Referring to FIGS. 5 and 6, the secondary battery was exploded at a high temperature.

Comparison Example 2

Figure 7:
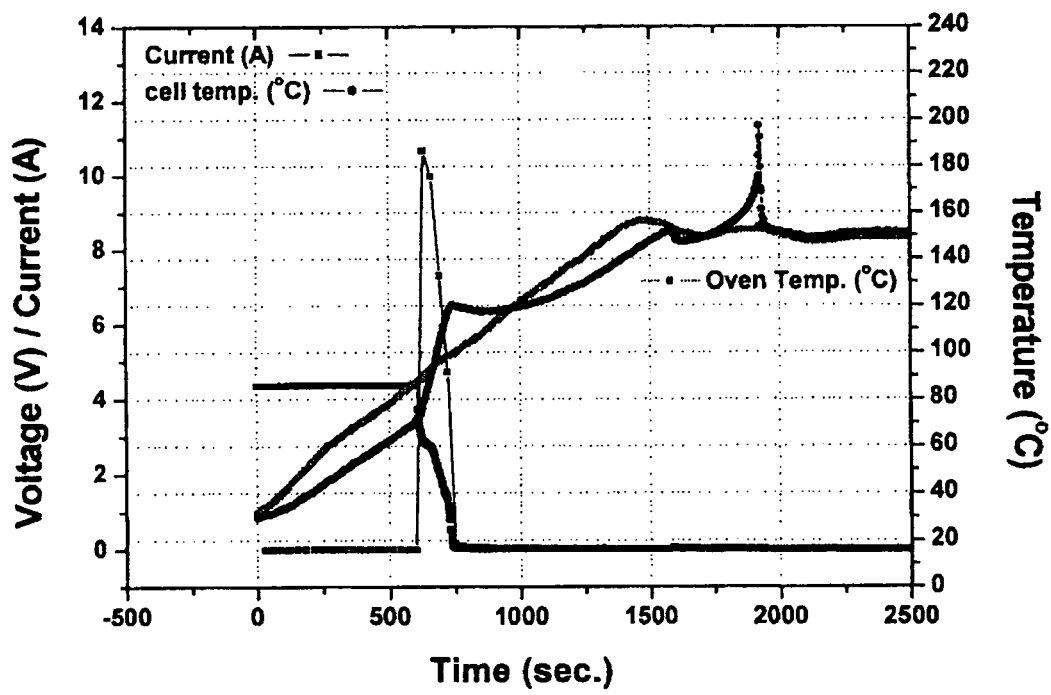
FIG. 7 is a graph showing an experiment of the second comparison example.
Figure 8:
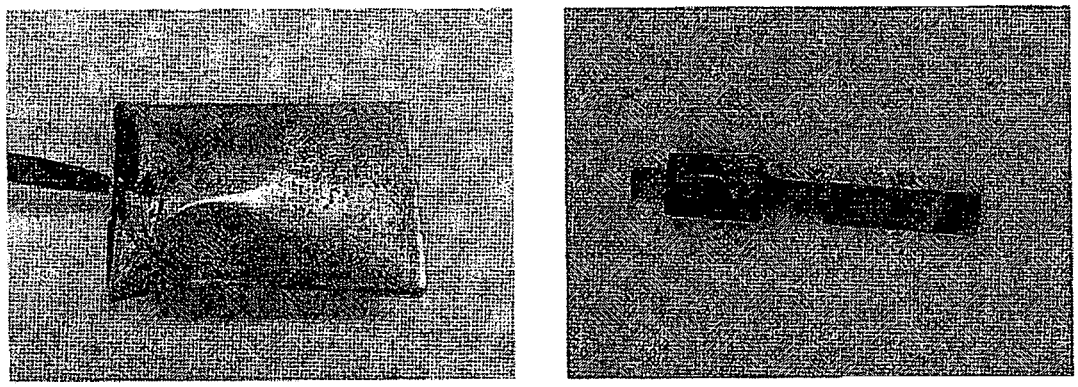
FIG. 8 is a view illustrating the secondary battery and a bimetal observed after an experiment is carried out by the method of the second comparison example.

A secondary battery identical with that of the third embodiment, excepting that a resistor was not used, was prepared and examined in such an identical manner with that of the third embodiment. The result is shown in FIGS. 7 and 8. Referring to FIGS. 7 and 8, the explosion of the secondary battery and the collapse of the bimetal were caused.

Fourth Embodiment

Figure 9:
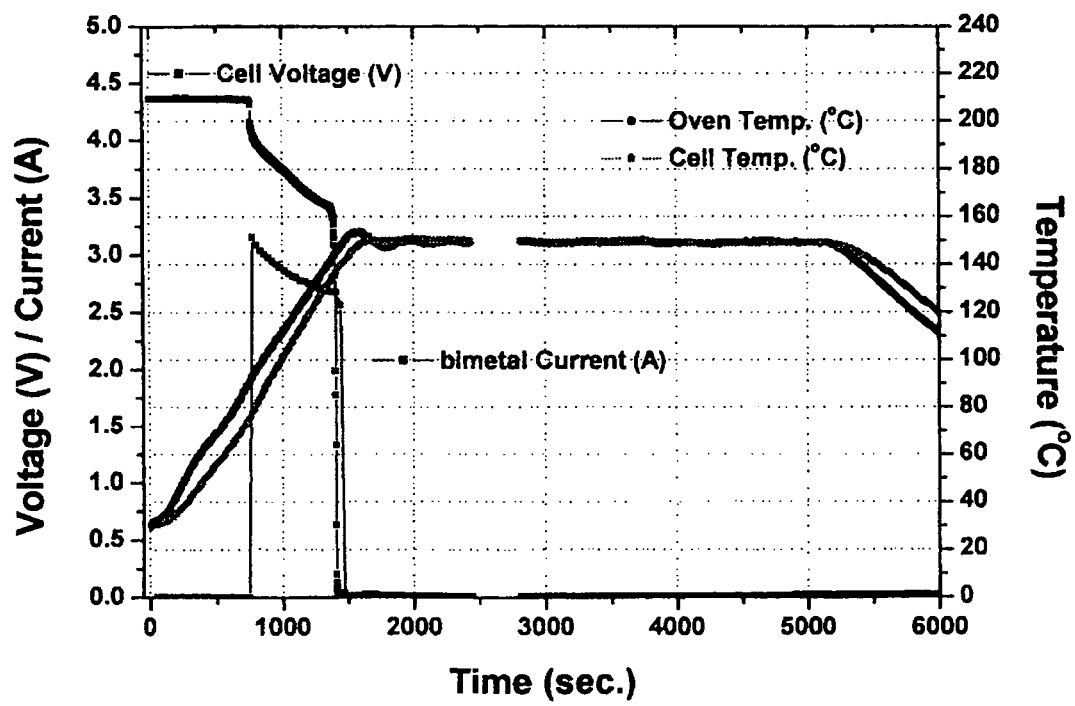
FIG. 9 is a graph showing an experiment according to the fourth embodiment of the present invention.
Figure 10:
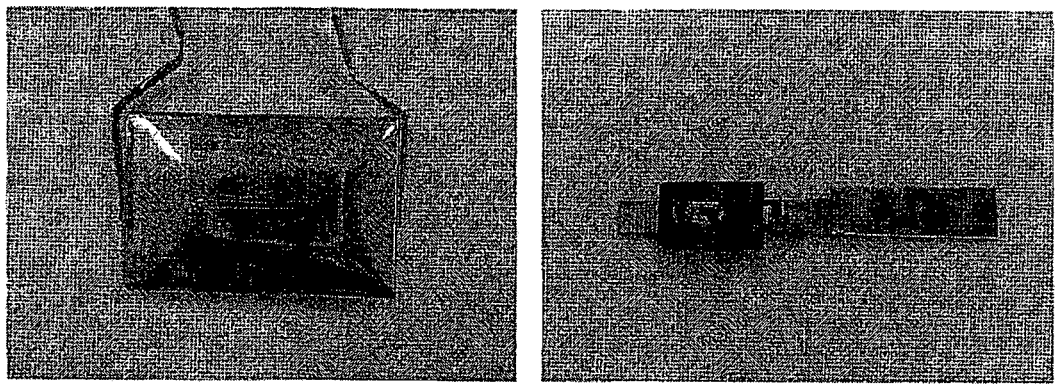
FIG. 10 is a view illustrating the secondary battery and a bimetal observed after an experiment is carried out by the method of the fourth embodiment of the present invention.

A secondary battery identical with that of the third embodiment, excepting that a resistor of 2Ω was used, was prepared and examined in an identical manner to that of the third embodiment. The result is shown in FIGS. 9 and 10. Referring to FIGS. 9 and 10, the explosion and ignition of the secondary battery and the collapse of the bimetal did not occur.

Fifth Embodiment

Figure 11:
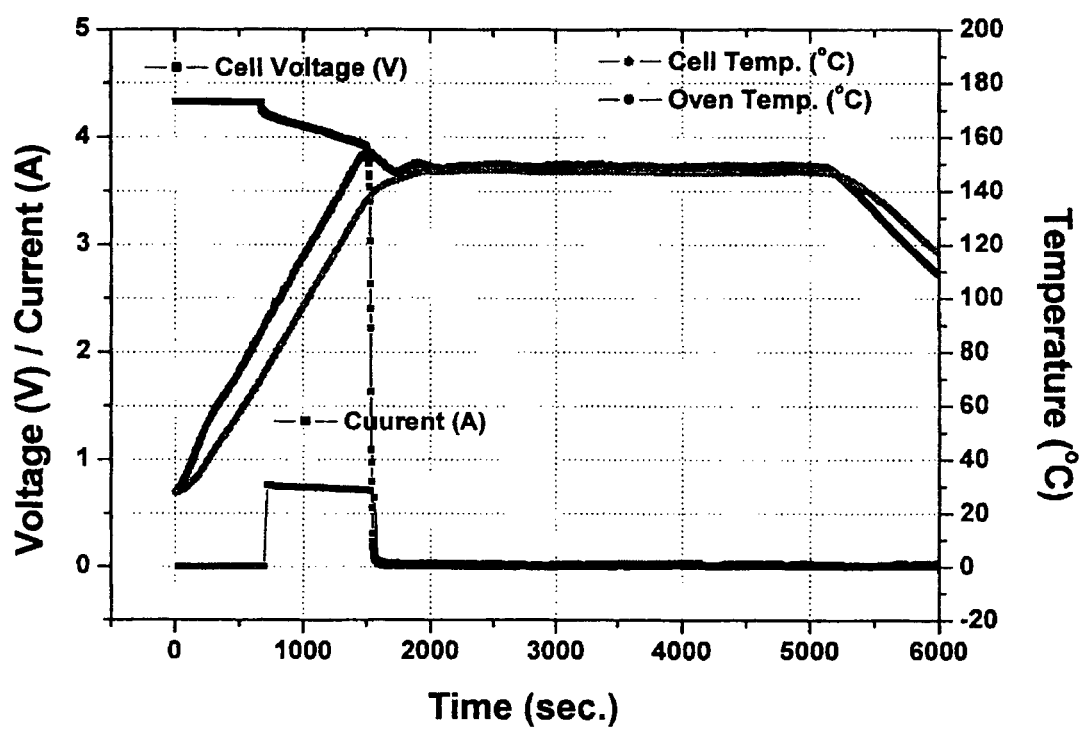
FIG. 11 is a graph showing an experiment according to the fifth embodiment of the present invention.
Figure 12:
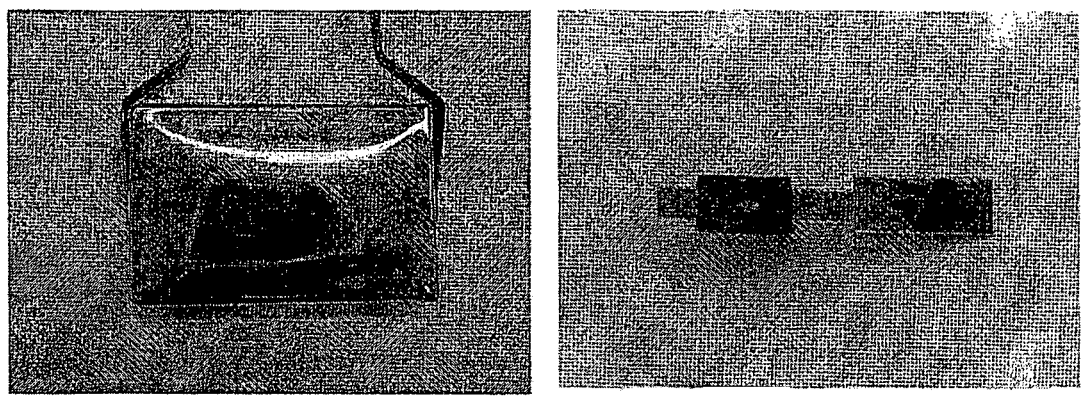
FIG. 12 is a view illustrating the secondary battery and a bimetal observed after an experiment is carried out by the method of the fifth embodiment of the present invention.

A secondary battery identical with that of the third embodiment, excepting that a resistor of 5Ω was used, was prepared and examined in an identical manner to that of the third embodiment. The result is shown in FIGS. 11 and 12. Referring to FIGS. 11 and 12, the explosion and ignition of the secondary battery and the collapse of the bimetal did not occur.

INDUSTRIAL APPLICABILITY

In order to prevent a temperature rise of the battery during an overcharge, the present invention uses a device for performing a desired switching operation in response to the temperature, instead of the PTC of the conventional art. The present invention interrupts electric current of an outer electrode which is applied to the second battery at a high temperature and also allows the secondary battery to be discharged, thereby improving the safety of the secondary battery.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A protection circuit for a secondary battery, comprising:
    a resistor having a first end connected to a negative electrode of the secondary battery and an opposite second end connected to an outer negative electrode, wherein the resistor is connected in series between the negative electrode of the secondary battery and the outer negative electrode;
    a bimetal having a first end and a second end;
    wherein the first end of the bimetal connects the positive electrode of the secondary battery to the outer positive electrode at room temperature;
    the second end of the bimetal connects the positive electrode of the secondary battery to the outer negative electrode and the second end of the resistor at a temperature higher than room temperature; and
    the first end of the bimetal does not connect the positive electrode of the secondary battery and the outer positive electrode at the temperature higher than room temperature.

2. The protection circuit for a secondary battery as claimed in claim 1, wherein the bimetal performs a desired switching operation at the temperature higher than room temperature.

3. The protection circuit for a secondary battery as claimed in claim 1, wherein the resistor is connected to the negative electrode of the secondary battery by a conductor formed on the negative electrode of the secondary battery.

4. The protection circuit for a secondary battery as claimed in claim 1, wherein the resistor has a resistance value which is large enough to avoid a collapse of the bimetal and small enough to safely discharge electric current from the secondary battery.

5. A secondary battery including the protection circuit according to claim 1.

6. The secondary battery as claimed in claim 5, wherein the bimetal performs a desired switching operation at the temperature higher than room temperature.

7. The secondary battery as claimed in claim 5, wherein the resistor is connected to the negative electrode of the secondary battery by a conductor formed on the negative electrode of the secondary battery.

8. The secondary battery as claimed in claim 5, wherein the resistor has a resistance value which is large enough to avoid a collapse of the bimetal and small enough to safely discharge electric current from the secondary battery.

* * * * *